United States Patent
Kallman et al.

(10) Patent No.: US 11,118,939 B2
(45) Date of Patent: Sep. 14, 2021

(54) CONDUCTIVE CLADDING FOR WAVEGUIDES

(71) Applicant: Apple Inc., Cupertino, CA (US)

(72) Inventors: Benjamin J. Kallman, Menlo Park, CA (US); Daniel C. Wagman, Los Gatos, CA (US)

(73) Assignee: Apple Inc., Cupertino, CA (US)

(*) Notice: Subject to any disclaimer, the term of this patent is extended or adjusted under 35 U.S.C. 154(b) by 283 days.

(21) Appl. No.: 16/290,440

(22) Filed: Mar. 1, 2019

(65) Prior Publication Data
US 2019/0195654 A1   Jun. 27, 2019

Related U.S. Application Data

(63) Continuation of application No. 14/834,039, filed on Aug. 24, 2015, now Pat. No. 10,240,947.

(51) Int. Cl.
| G01D 5/12 | (2006.01) |
| H01P 3/16 | (2006.01) |
| H01P 5/08 | (2006.01) |
| H01R 13/62 | (2006.01) |

(52) U.S. Cl.
CPC ............... *G01D 5/12* (2013.01); *H01P 3/16* (2013.01); *H01P 3/165* (2013.01); *H01P 5/087* (2013.01); *H01R 13/6205* (2013.01)

(58) Field of Classification Search
CPC . G01D 5/12; H01P 3/165; H01P 5/087; H01P 3/16; H01R 13/6205
See application file for complete search history.

(56) References Cited

U.S. PATENT DOCUMENTS

| 3,275,956 A | 9/1966 | Prache |
| 4,925,269 A | 5/1990 | Scrivener |
| 5,861,782 A | 1/1999 | Saitoh et al. |
| 6,421,161 B1 | 7/2002 | Rice et al. |
| 7,317,847 B1 | 1/2008 | Wang et al. |
| 8,757,893 B1 | 6/2014 | Isenhour et al. |

(Continued)

FOREIGN PATENT DOCUMENTS

| EP | 1041666 | 10/2000 |
| EP | 1096596 | 5/2001 |

(Continued)

OTHER PUBLICATIONS

U.S. Appl. No. 14/834,039, Non-Final Office Action, dated Jul. 17, 2018, 15 pages.

(Continued)

*Primary Examiner* — Daniel R Miller
(74) *Attorney, Agent, or Firm* — Kilpatrick Townsend & Stockton

(57) ABSTRACT

A waveguide structure to allow device to determine its orientation are disclosed. The waveguide may be formed of a dielectric core and a cladding. The dielectric core may be formed of a solid dielectric material that conducts radio waves at millimeter wave frequencies and above. The cladding may encapsulate the core, and may include at least two conductive portions. Each conductive portion may be disposed around less than the entire core. The conductive portions allow electrical signals to flow between two devices to determine an orientation of the waveguide.

22 Claims, 10 Drawing Sheets

(56) References Cited

U.S. PATENT DOCUMENTS

| | | |
|---|---|---|
| 2010/0080563 A1 | 4/2010 | Difonzo et al. |
| 2014/0285291 A1* | 9/2014 | Payne et al. |
| 2017/0018332 A1* | 1/2017 | Barzegar ............... H04B 3/54 |
| 2017/0059356 A1 | 3/2017 | Kallman |

FOREIGN PATENT DOCUMENTS

| | | |
|---|---|---|
| EP | 2009731 | 12/2008 |
| JP | 02183218 | 7/1990 |
| KR | 20050057711 | 6/2005 |
| TW | 201719962 | 6/2017 |
| WO | 2002041054 | 5/2002 |
| WO | 2013027268 | 2/2013 |
| WO | 2017034675 | 3/2017 |

OTHER PUBLICATIONS

U.S. Appl. No. 14/834,039, Notice of Allowance, dated Nov. 6, 2018, 15 pages.

International Patent Application No. PCT/US2016/040339, International Search Report and Written Opinion, dated Jan. 2, 2017, 17 pages.

International Patent Application No. PCT/US2016/040339, Invitation to Pay Add'l Fees and Partial Search Report, dated Oct. 21, 2016, 8 pages.

Taiwan Patent Application No. TW105122277, Office Action, dated Nov. 6, 2017, 3 pages.

Taiwan Patent Application No. TW105122277, Office Action, dated Oct. 5, 2018, 8 pages.

\* cited by examiner

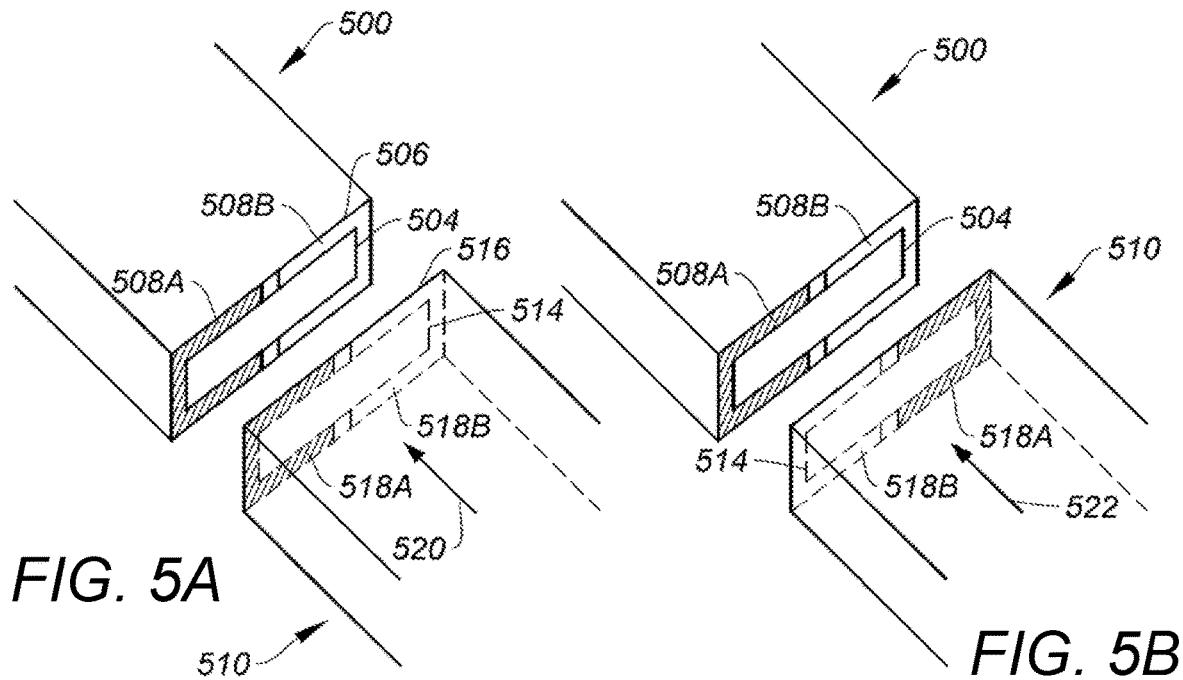
FIG. 5A
FIG. 5B
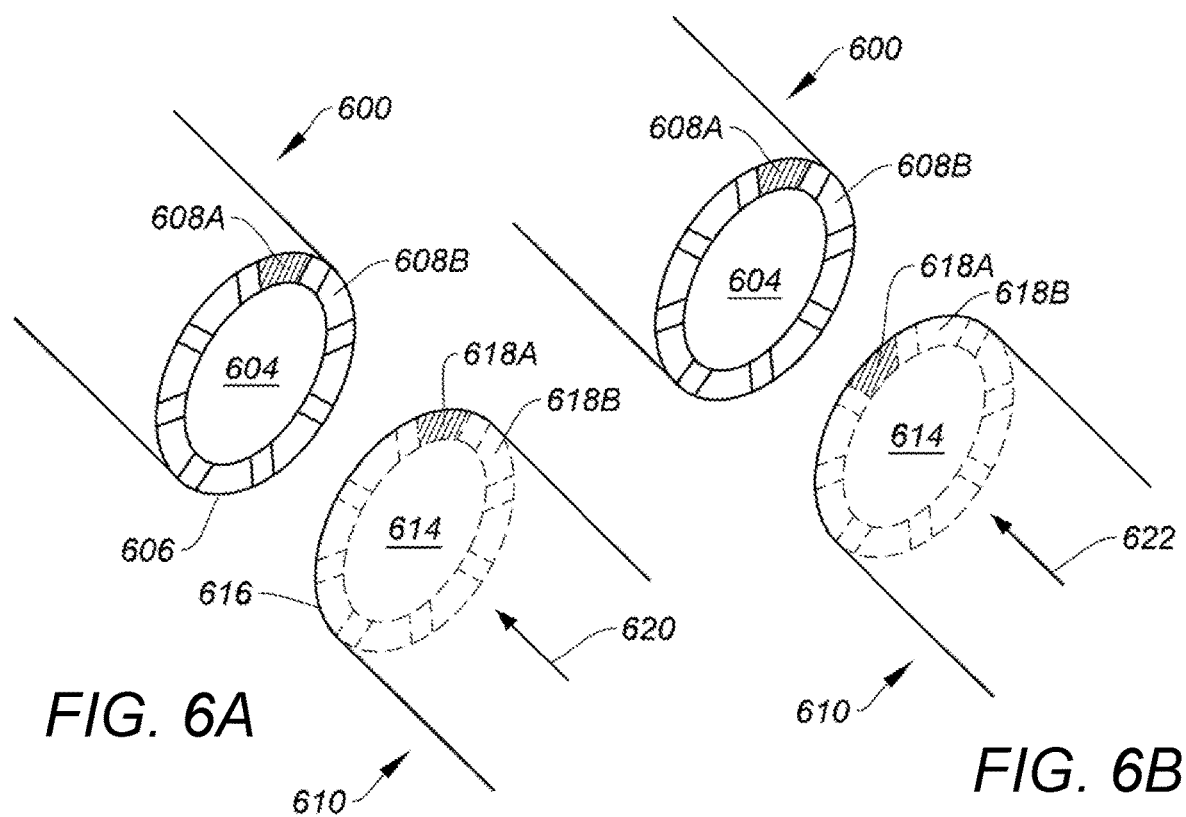
FIG. 6A
FIG. 6B

CONDUCTIVE CLADDING FOR WAVEGUIDES

CROSS-REFERENCES TO RELATED APPLICATIONS

This application is a continuation of U.S. patent application Ser. No. 14/834,039, filed on Aug. 24, 2015 and titled "Conductive Cladding for Waveguides," the disclosure of which is herein incorporated by reference in its entirety for all purposes.

BACKGROUND

Modern mobile devices, such as smart phones, smart watches, tablets, laptops, and the like, will occasionally be connected to another device. For instance, smart phones may be connected to a computer to receive and/or send data. Similarly, smart watches may be connected to a docking station to receive and/or send data. Accessories may be used to connect the devices to one another. For example, a cable can be used to connect the smart phone to the computer.

Presently, cables containing conductive wires are generally used for data transmission. Such cables transmit data by allowing voltages to be applied through the conductive wires at a predetermined frequency. The maximum frequency at which data can be transferred through the conductive wire may be limited, however, due to limitations of conductive materials, such as the resistance of the conductive material. Furthermore, utilizing conductive wires to transmit data requires the use of receptacles on the receiving side, which may often create openings within which moisture and/or debris may enter. Utilizing conductive wires may also suffer from capacitive coupling between wires running high frequency signals which can impede signal transmission. To avoid capacitive coupling, shielding solutions may be implemented to shield signal lines; however, such shielding solutions can be bulky in size.

One way to overcome such limitations is to utilize waveguides for sending a wave, e.g., electromagnetic waves for data transmission instead of conductive wires. Waveguides are structures that enable wave signals to propagate with minimal loss of energy. Waveguides are particularly useful for transmitting waves that are not normally capable of efficient transmission in the atmosphere. As an example, very high frequency waves (e.g., millimeter waves) that easily disperse in the atmosphere can be contained within a waveguide to prevent dispersion of transmitted signals. By enabling the transmission of millimeter waves, transmissions performed at frequencies substantially higher than that of conductive wires (e.g., tens or even hundreds of gigahertz (GHz)) can be achieved.

In order for successful transmission with waveguides, however, the orientation of millimeter waves transmitted from the sending device needs to match the orientation of the waveguide in the receiving device. That is, the orientation of the waveguide of the sending device should match the orientation of the waveguide in the receiving device. If the orientation of the waveguides are different, then the transmission signals received by the receiving device may be interpreted incorrectly. Improvements to such waveguides are desired.

SUMMARY

Embodiments provide improved devices and methods for determining waveguide orientation. As an example, a waveguide may be formed of a core encapsulated by a cladding. The core may be a solid dielectric material that conducts radio waves at millimeter wave frequencies and above. The cladding may include conductive portions within which electrical signals may be sent for determining the orientation of the waveguide. Determining the orientation of the waveguide is important for data transfer because successful data transmission may be highly dependent upon the orientation of the waves. Having conductive portions in the waveguide cladding allows data to be successfully transmitted through the core when the waveguides are mated in any orientation.

In some embodiments, a waveguide is formed of a dielectric core encapsulated by a cladding. The core may be formed of a dielectric material that conducts radio waves at millimeter wave frequencies and above, and the cladding may include at least two conductive portions. Each conductive portion may be disposed around less than the entire core. The conductive portions may enable devices to communicate with one another to properly transmit data at the correct orientation.

In certain embodiments, a waveguide system may include a waveguide having a dielectric core encapsulated by a cladding. The cladding may include at least two conductive portions electrically isolated from each other by insulation portions. The waveguide system may further include processor configured to interact with the waveguide, and at least one antenna coupled to the processor. The antenna may be configured to send data through the dielectric core of the waveguide. The waveguide system may further include at least one sensor corresponding to the at least one antenna. The sensor may be coupled to the processor and configured to couple with at least two conductive portions of the waveguide cladding to determine an orientation of the dielectric core.

In some embodiments, a method of determining waveguide orientation includes receiving, by at least one sensor, an electrical signal sent through a cladding of a transmitting waveguide when the transmitting waveguide is mated with a receiving waveguide. The method may include determining a location of the at least one sensor. In embodiments, the method may further include determining an orientation of the transmitting waveguide by referencing the location of the at least one sensor.

A better understanding of the nature and advantages of embodiments of the present invention may be gained with reference to the following detailed description and the accompanying drawings.

BRIEF DESCRIPTION OF THE DRAWINGS

FIG. 5A is a simplified diagram illustrating a matching orientation for rectangular waveguide-to-waveguide interfaces, in accordance with embodiments of the present invention.

FIG. 5B is a simplified diagram illustrating an offset orientation for rectangular waveguide-to-waveguide interfaces, in accordance with embodiments of the present invention.

FIG. 6A is a simplified diagram illustrating a matching orientation for circular waveguide-to-waveguide interfaces, in accordance with embodiments of the present invention.

FIG. 6B is a simplified diagram illustrating an offset orientation for circular waveguide-to-waveguide interfaces, in accordance with embodiments of the present invention.

DETAILED DESCRIPTION

Figure 1A:
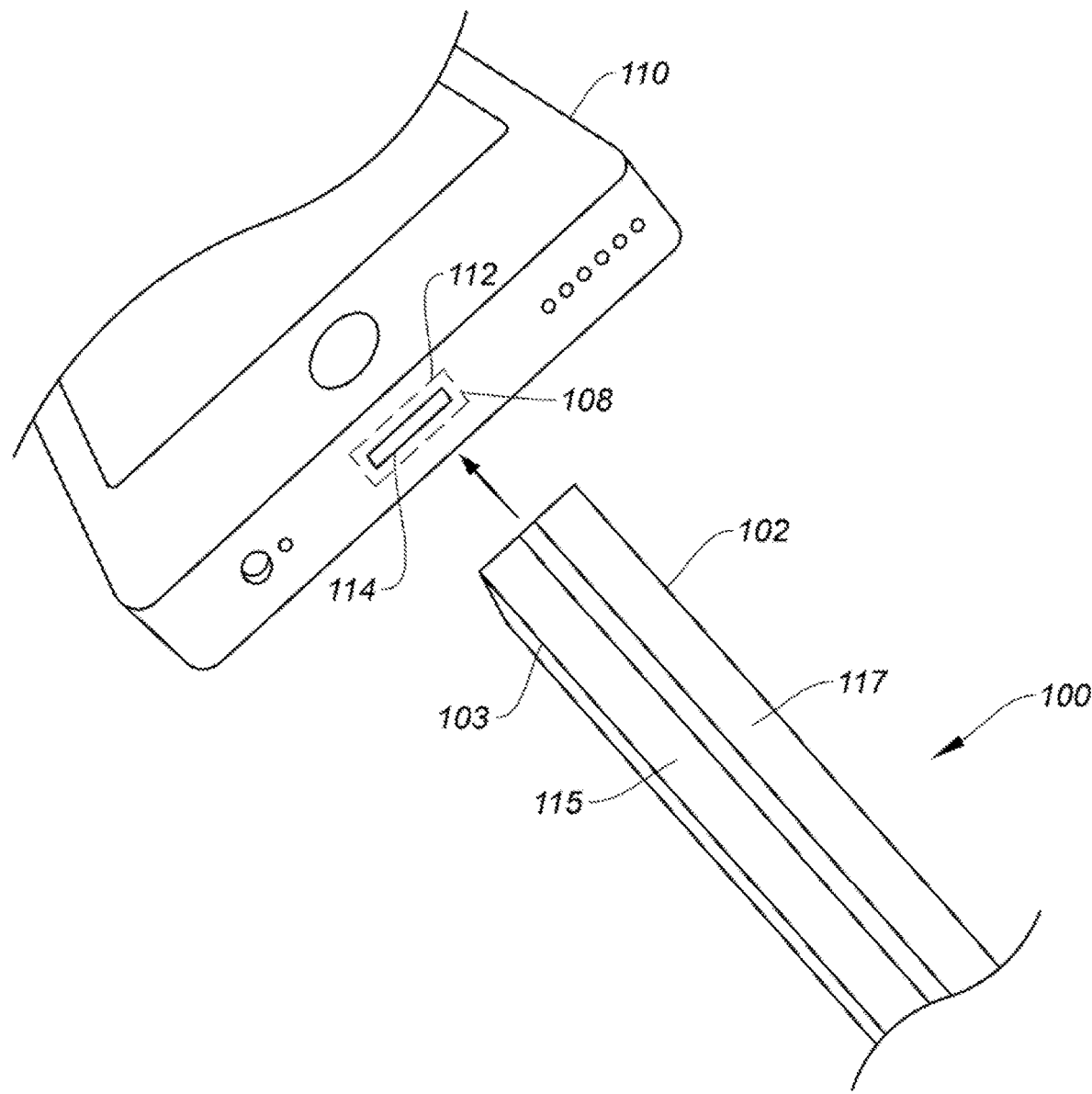
FIG. 1A is a simplified diagram of a waveguide mating with a device, in accordance with embodiments of the present invention.

Embodiments describe a waveguide having a dielectric core and a conductive cladding surrounding at least a portion of the dielectric core. The core may be formed from a solid dielectric material that conducts radio waves at millimeter wave frequencies and above. The cladding may include conductive portions through which electrical signals may be sent for the purpose of determining waveguide orientation. For instance, as shown in FIG. 1A, a waveguide 102 that is part of a cable 100 can be used to transmit data between a first electronic device 110 and a second electronic device (not shown). Cable 100 can be connected between the first and second devices in at least two different orientations, rotated 180 degrees from each other. For data transmitted through wave 102 to be interpreted properly, device 110 may need to determine which of the two orientations waveguide 102 has been connected to it in. Towards this end, waveguide 102 may have a cladding 103. Cladding 103 may encapsulate a core (not shown) and may include conductive portions 115 and 117.

Electrical signals may be sent through conductive portions 115 and 117 to determine the orientation of the waveguide as will be described herein. In embodiments, if it is determined that the orientation of waveguide 102 is offset by 180 degrees, transmission waves sent through the core may be compensated accordingly, for example by altering a phase of the transmission waves, resulting in a matching orientation. This allows waveguide 102 to be coupled to device 110 without having to be cognizant of its orientation, thereby increasing user friendliness and enhancing user experience.

Figure 1B:
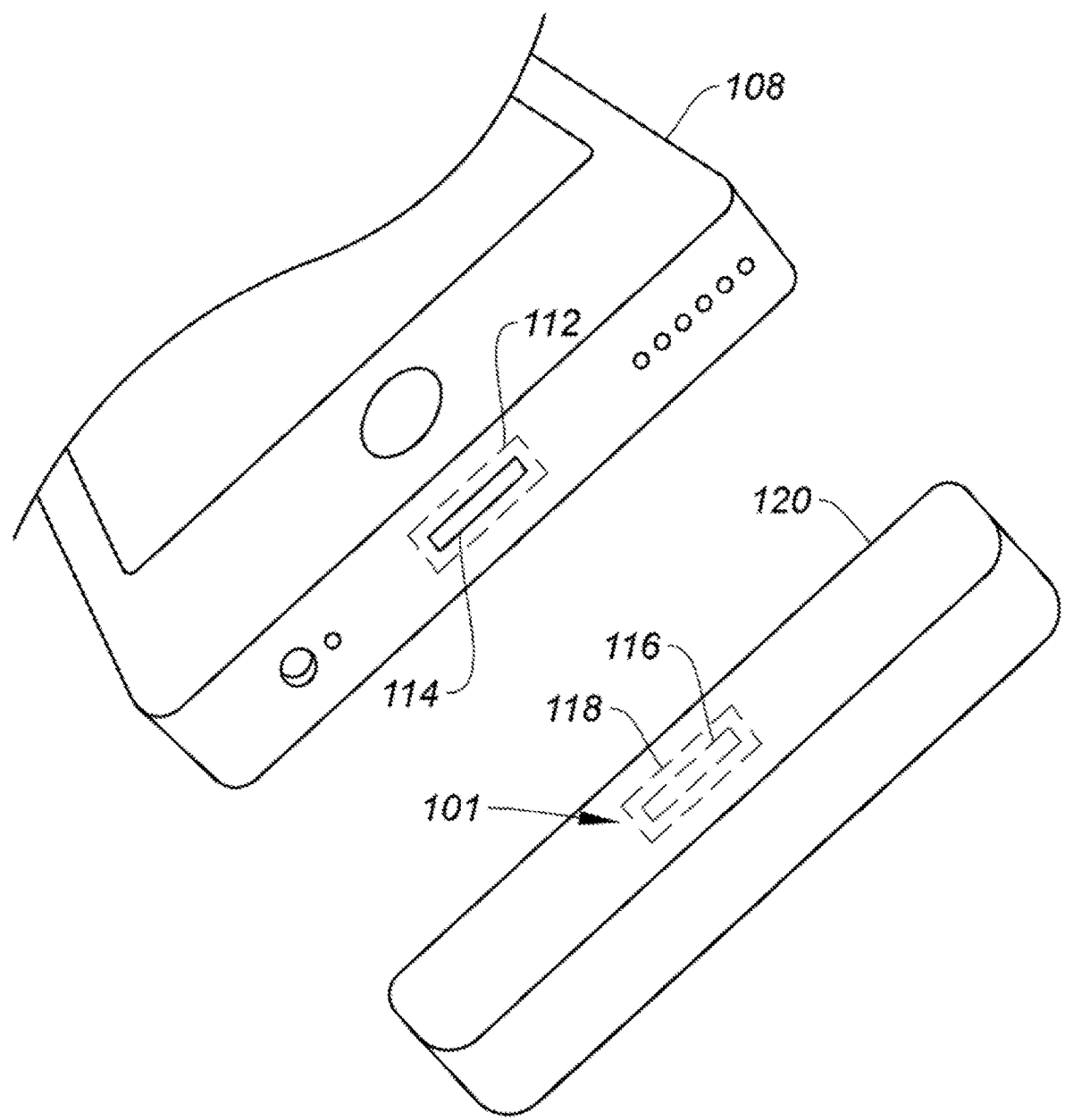
FIG. 1B is a simplified diagram of a docking station having an embedded waveguide mating with a device, in accordance with embodiments of the present invention.

Although FIG. 1A illustrates waveguide 102 as a separate cable, embodiments are not intended to be limited to such implementations. For instance, as shown in FIG. 1B, a waveguide 101 with conductive cladding may be embedded in a docking station 120. Sensors or conductive portions of the cladding may be exposed in regions 118 around window 116. To couple device 108 to docking station 120, device 108 may simply be placed on a respective area of docking station 120 such that window 114 of device 108 is aligned with window 116. Windows 114 and 116 may be radio frequency (RF) transparent windows through which transmission waves transmitted through the dielectric core of waveguide 101 are capable of propagating. Similar to the cable 100, the conductive cladding of the embedded waveguide in docking station 120 may be used to determine its orientation with respect to window 114 of device 108.

I. Waveguide with Conductive Cladding

Figure 2A:
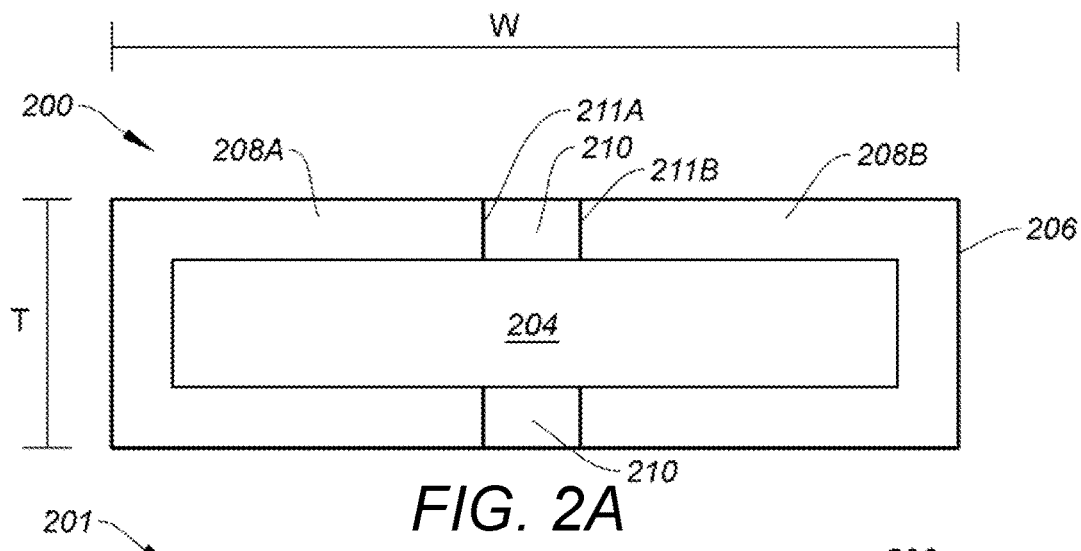
FIG. 2A is a simplified diagram of a cross-sectional view of a rectangular waveguide, in accordance with embodiments of the present invention.
Figure 2B:
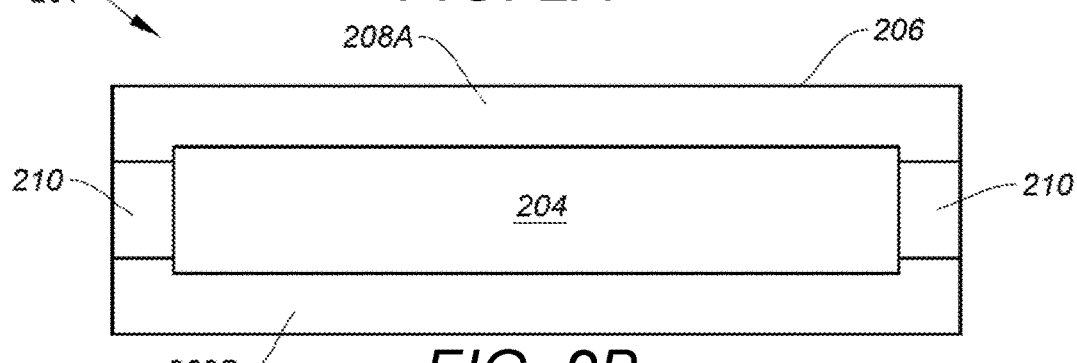
FIG. 2B is a simplified diagram of a cross-sectional view of a rectangular waveguide, in accordance with embodiments of the present invention.
Figure 2C:
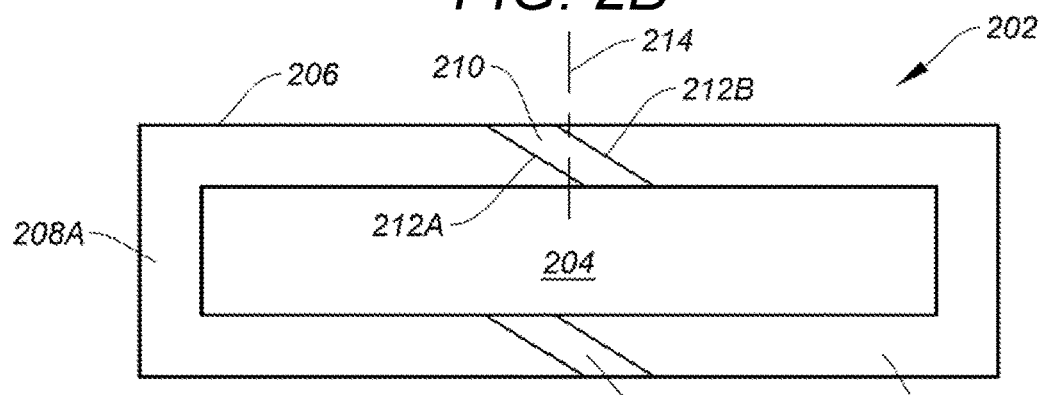
FIG. 2C is a simplified diagram of a cross-sectional view of a rectangular waveguide having modified ends, in accordance with embodiments of the present invention.

FIGS. 2A-2C illustrate cross-sectional views of exemplary waveguides with conductive cladding according to embodiments of the present invention. Specifically, FIGS. 2A and 2B illustrate cross-sectional views of waveguides having two conductive regions in different arrangements. FIG. 2C illustrates a cross-sectional view of a waveguide having more than two conductive regions.

With reference to FIG. 2A, waveguide 200 includes a solid dielectric core 204 disposed at the center of waveguide 200. Core 204 may be a region of the waveguide 200 within which transmission waves, e.g., electromagnetic waves, may propagate. In embodiments, core 204 may have a cross-sectional profile in the form of any geometric shape. For instance, core 204 may be rectangular, circular, oval, square, and the like. In certain embodiments, core 204 is shaped according to properties of the transmission wave propagating inside of it. As an example, core 204 may be shaped as a rectangle for transmission of high-frequency millimeter waves. High-frequency millimeter waves may have a wave length of 1 to 10 millimeters and can transmit at a frequency of tens of GHz, e.g., 40 to 90 GHz. Any suitable material conducive to wave propagation may be used to form the core 204, such as, but not limited to, plastics and glass. In an embodiment, core 204 is formed of extruded plastic.

Core 204 may be encapsulated by a cladding 206. Cladding 206 may include conductive portions 208. In some embodiments, cladding 206 includes two conductive portions: a first conductive portion 208A and a second conductive portion 208B. Each conductive portion may be disposed directly adjacent to core 204. Conductive portions 208A and 208B may be utilized to determine an orientation of waveguide 200, as discussed herein. The number of conductive portions used for purposes of determining waveguide orientation may be determined based upon the number of different orientations that could occur when the waveguide is mated (i.e., when core 204 is aligned with a receiving core to enable data transmission). For instance, when waveguide 200 has a rectangular cross-section in which the width (W) of the cross-section is different than the thickness (T), only two orientations can occur when mated: 0 degrees, or 180 degrees. Thus, waveguide 200 may be structured to have two conductive portions 208A and 208B. For waveguides that have more than two orientations, then more than two conductive portions may be used for determining waveguide orientation, as will be discussed further herein.

Conductive portions 208A and 208B may have ends 211A and 211B, respectively, that are substantially perpendicular to an adjacent surface of core 204. Additionally, conductive portions 208 may be symmetrically placed about core 204. For instance, as shown in FIG. 2A, portions 208A and 208B are symmetrically placed about core 204 such that portions 208A and 208B are equally spaced apart around cladding 206. In embodiments, portion 208A is a mirror image of portion 208B across a vertical center of waveguide 200. Additionally, each conductive portion may conform to at least a portion of core 204. In such embodiments, each conductive portion 208A and 208B may wrap around two corners of core 204 such that each conductive portion appears to be the letter "u" tipped on its side. Although FIG. 2A illustrates portions 208A and 208B arranged as mirror images across a vertical center of waveguide 200, embodiments are not so limited. For instance, portions 208A and 208B may be arranged as mirror images across a horizontal center of waveguide 201, as illustrated in FIG. 2B. It is to be appreciated that any symmetrical arrangement of conductive portions 208A and 208B about core 204 is in line with the spirit and scope of the present invention. The number of conductive portions 208A and 208B may vary, however, as will be discussed further herein.

Conductive portions 208A and 208B may be utilized by devices to determine an orientation of waveguide 200. Thus, it is important for electrical signals that are sent through the conductive portions 208A and 208B to be undisturbed. Accordingly, in embodiments, insulation portions 210 may be disposed between conductive portions 208A and 208B. Insulation portions 210 may prevent shorting between conductive portions 208A and 208B by electrically isolating conductive portions 208A and 208B from one another. Insulation portions 210 may be included as a part of cladding 206.

Cladding 206 may help contain transmission waves within core 204. Thus, it may be beneficial for cladding 206 to be constructed with materials that reflect waves back into core 204. To achieve this functionality, cladding 206 may be formed of materials that have dielectric constants that are different than the dielectric constant of the material forming core 204. For instance, cladding 206 may have dielectric constants that are less than core 204.

It is to be noted that, as aforementioned herein, conductive portions 208A and 208B allow electrical signals in the form of voltage and/or current to be applied through waveguide 200, while insulation portions 210 electrically isolate conductive portions 208A and 208B from one another. Thus, while their dielectric constants may be similar, their electrical properties may be different. As a result, conductive regions 208A and 208B may be formed of a metal while insulation portions 210 are formed of an anodized metal. For instance, conductive portions 208A and 208B may be formed of copper and insulation portions 210 may be formed of anodized aluminum. Alternatively, in some embodiments, conductive regions 208A and 208B may be formed of a metal while insulation portions 210 may be formed of a metal coated with a thick layer of oxide. As an example, conductive regions 208A and 208B may be formed of copper while insulation portions 210 are formed of titanium or a titanium alloy coated with a thick layer of oxide.

FIG. 2C illustrates an alternative cladding configuration where conductive portions 208A and 208B have modified ends 212A and 212B. Modified ends 212A and 212B may taper and overlap one another such that an imaginary line drawn perpendicular to the surface of core 204 crosses both ends 212A and 212B. In such embodiments, insulation portion 210 does not need to be formed of a material that reflects waves back into core 204. This is because the overlapping arrangement of modified ends 212A and 212B may already make it very difficult for waves to leak out of core 204. Thus, insulation portion 210 may not need to be formed of a material having a dielectric constant similar to that of the conductive portions 208A and 208B. Rather, insulation portions 210 may be formed of an insulating material having a different dielectric constant than the conductive portions 208A and 208B. For instance, insulation portion 210 may be formed of a non-conductive plastic while conductive portions 208A and 208B are formed of copper and core 204 is formed of extruded plastic. In embodiments, only a part of conductive portion 208A overlaps with a part of conductive portion 208B. The overlapping conductive portions may be implemented in any embodiments discussed hereinafter.

In embodiments, conductive portions 208A and 208B may cover a majority of the surface area of core 204. For example, conductive regions 208 may cover at least 75% of the surface area of core 204. In embodiments, conductive regions 208 may cover 90% of the surface area of core 204.

It is to be appreciated that the various structures, e.g., conductive portions 208A and 208B, and insulation portions 210, may be separate structures that are attached to one another. For instance, the structures may be adhered to one another with an adhesive or a curing process, or mechanically attached to one another with a fastener. Alternatively, the various structures may be all part of one monolithic structure. In such instances, conductive portions 208A and 208B, and insulation portions 210 may be formed by altering the monolithic structure. As an example, corresponding parts of the monolithic structure may be treated (e.g., by chemical treatment and/or doping) to acquire the desired characteristics as discussed herein.

The size of waveguide 200 may be any size suitable for transmission of waves. For example, waveguide 200 may have a thickness T and a width W suitable for transmission of millimeter waves. Thickness T may be approximately half of the wavelength of the transmission waves. Additionally, width W may be dependent on the dielectric constant of core 204. In some embodiments, waveguide 200 may have thickness T ranging between 0.15 and 0.5 mm, and width W ranging between 2 to 6 mm. In certain embodiments, waveguide 200 has thickness T of 0.25 mm and width W of 4 mm.

Embodiments illustrated in FIGS. 2A-2C have two conductive portions. However, embodiments are not limited to such configurations. For instance, claddings in other embodiments may have more than two conductive portions.

A. More than Two Conductive Portions

Figure 3:
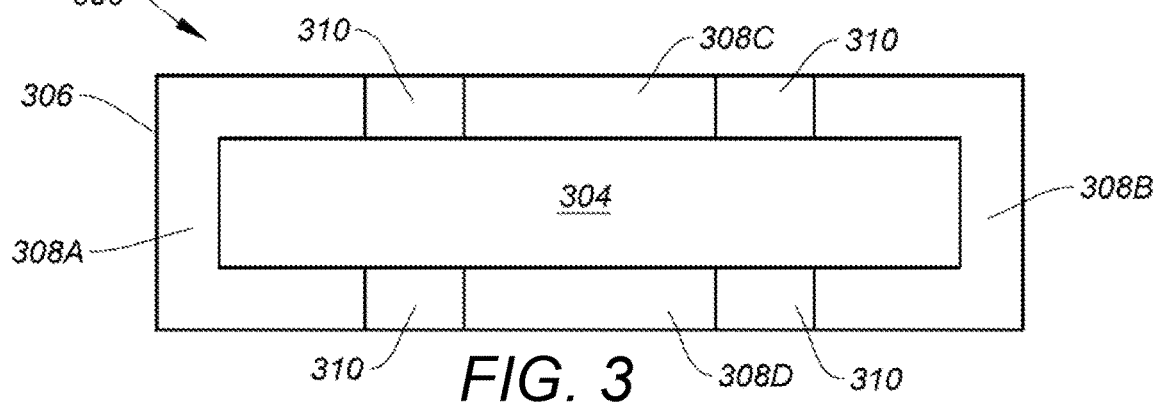
FIG. 3 is a simplified diagram of a cross-sectional view of a rectangular waveguide having more than two conductive portions for determining waveguide orientation, in accordance with embodiments of the present invention.

FIG. 3 illustrates a waveguide 300 having four conductive portions: first conductive portion 308A, second conductive portion 308B, third conductive portion 308C, and fourth conductive portion 308D. Insulation portions 310 may be disposed between conductive portions 308A-308D to electrically isolate conductive portions 308A-308D from one another and to prevent electrical short circuiting between them. Given that waveguide 300 is rectangular, two of the four conductive portions may be used for determining an orientation of waveguide 300. As discussed with respect to FIG. 2A, the conductive portions for determining an orientation of a waveguide are arranged symmetrically about the core. Thus, the two conductive portions for determining orientation may be 308A and 308B, or 308C and 308D. Conductive portions that are not used for determining an orientation of waveguide 300 may be used for various other purposes. For instance, if 308A and 308B are used for determining orientation, conductive portions 308C and 308D may be used for providing power.

Transmission waves generally cannot send power between devices. Waves traveling through the dielectric core of waveguides primarily transmit data. In order to supply power, some embodiments of the invention supply power through a conductive material surrounding the dielectric core that allows transmission of power through current flow. In some embodiments, cladding 306 may be used for providing power by utilizing conductive portions 308C and 308D for supplying current to a connected device. That way, only one cable and/or connection is needed for purposes of data transfer and device charging/powering, thereby increasing simplicity/user friendliness, and decreasing cost.

In some embodiments, conductive portions that are not being used for determining orientation, e.g., 308C and 308D, can be used for transmission of data at a low rate, i.e., at a frequency lower than that of waves, e.g., millimeter waves, sent through core 304. Transmitting data in the form of high frequency millimeter waves through core 304, although particularly useful for transmission of large data quantities, can consume a significant amount of power. Everyday use of a device, however, may not need to transfer large quantities of data all the time, such as when a device identification, synchronizing command, handshaking signal, etc. is being sent to/from the device. It may therefore be a waste of power to utilize high-frequency millimeter waves for all transmissions without considering the quantity of data being transferred. Accordingly, it may be desirable to send lower quantities of data via a transmission method that requires less power. In embodiments, conductive portions 308C and 308D may be utilized for such purposes. Specifically, conductive portions 308C and 308D may be utilized as conductive wires for transmitting data at a lower frequency than that of core 304. That way, waveguide 300 may save power by selectively utilizing high-frequency data transfer for large quantities of data (e.g., quantities of data greater than a threshold quantity) and low-frequency data transfer for smaller quantities of data.

The materials used to form insulation portions 310 and conductive portions 308A-308D may be the same materials discussed herein with respect to FIGS. 2A-2C.

In other embodiments, conductive portions utilized for determining waveguide orientation can also be used for providing power and/or transmitting data at a low rate. For instance, conductive portions 208A and 208B of waveguide 200 discussed in FIGS. 2A-2C may be used for determining waveguide orientation, providing power, and transmitting data at a low rate. In such embodiments, a single waveguide having two conductive portions can be used to provide multiple functionalities.

B. Circular Structure

Figure 4:
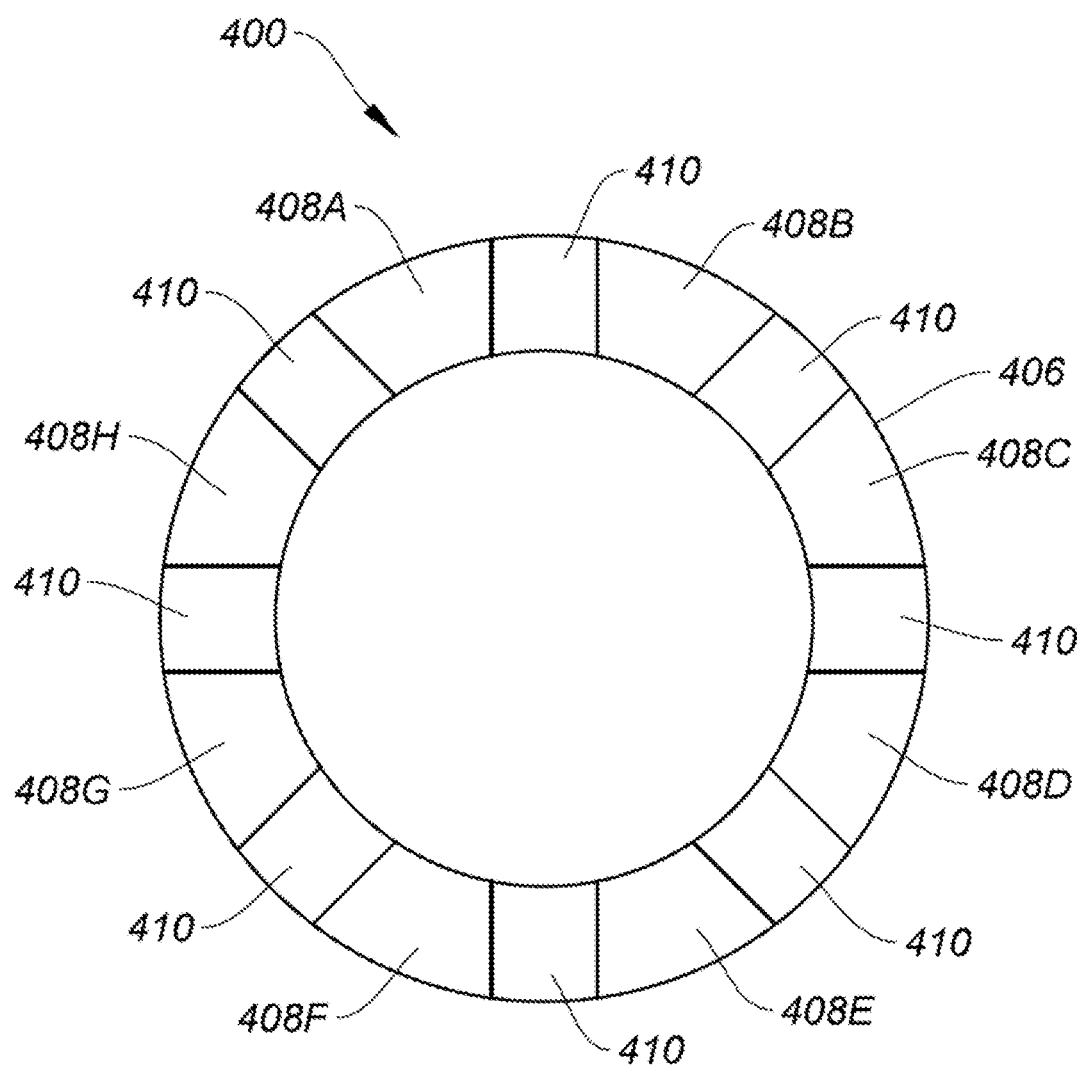
FIG. 4 is a simplified diagram of a cross-sectional view of a circular waveguide, in accordance with embodiments of the present invention.

FIGS. 2A-2C and 3 illustrate rectangular waveguides; however, as mentioned herein, a waveguide does not have to be rectangular, but can have any geometric shape, such as circular, oval, triangular, square, etc. FIG. 4 illustrates a circular waveguide 400 according to embodiments of the present invention.

Waveguide 400 is formed of a solid dielectric core 404 encapsulated by a cladding 406. Cladding 406 includes a series of conductive portions 408A-408H and isolation portions 410 disposed between adjacent conductive portions 408A-408H. Purposes, arrangements, and material compositions of conductive portions 408A-408H and isolation portions 410 may be similar to corresponding parts of waveguides already discussed herein. In embodiments, additional conductive portions may be included in cladding 406 for purposes other than determining orientation, such as providing power and low frequency data transmission, as discussed herein with respect to FIG. 3.

In contrast to rectangular waveguides, which may mate in two different orientations, circular waveguides are geometrically structured such that they can mate in an infinite number of orientations. That is, the circular shape can be rotated in an infinite number of angles. Thus, to determine an orientation of circular waveguides, larger numbers of conductive portions may increase the ability of the cladding to determine the orientation of circular waveguides. For instance, a circular cladding may include at least two, preferably at least four or eight conductive portions as shown in FIG. 4. When waveguides mate, a waveguide-to-waveguide interface is formed, the details of which are discussed herein.

II. Waveguide-to-Waveguide Interface

A waveguide-to-waveguide interface is a point in space where two waveguides mate such that signals may transmit from one waveguide into the other. When mated, the conductive cladding can be used to determine their orientation with respect to one another to ensure proper data transmission through their respective cores.

FIGS. 5A-5B and 6A-6B illustrate exemplary waveguide-to-waveguide interfaces for two waveguides. One waveguide may be emitting a transmission wave and the other waveguide may be receiving the transmission wave. As illustrated, a substantial amount of space exists between the two waveguides for ease of illustration and explanation. One skilled in the art understands that when two waveguides are mated, a very small or no air gap may exist between the two waveguides. Further, even though the two waveguides are illustrated as cables, embodiments are not so limited. For instance, one or both waveguides may be embedded within a device. When a waveguide is embedded, an RF-transparent window (not shown) may be formed on the device to allow waves to enter in and exit out of the device. That way, waves may transmit into and out of the embedded waveguide while providing a hermetic seal to prevent moisture and/or debris from entering into the device. The RF-transparent window may be disposed between the two waveguides illustrated in FIGS. 5A-5B and 6A-6B.

In FIGS. 5A and 5B, different mating arrangements of a waveguide-to-waveguide interface for rectangular waveguides are illustrated, according to embodiments of the present invention. Specifically, FIG. 5A illustrates an aligned waveguide-to-waveguide interface where both waveguides are arranged in the same orientation, and FIG. 5B illustrates a misaligned waveguide-to-waveguide interface where both waveguides are arranged in different orientations.

With reference to FIG. 5A, a receiving waveguide 500 may be mated with a transmitting waveguide 510. When mated, a dielectric core 504 of waveguide 500 may be aligned with a dielectric core 514 of waveguide 510. Additionally, conductive portions 508A and 508B of waveguide 500 may be aligned with conductive portions 518A and 518B of waveguide 510. Proper orientation of waveguide 500 and 510 may be when conductive portions 508A and 518A are mated with one another. Conductive portions 508A and 518A are shaded to better illustrate their respective positions. Because waveguides 500 and 510 are oriented properly with one another, a transmission wave 520 sent from core 514 to core 504 may be properly received by waveguide 500.

However, if waveguides 500 and 510 are not oriented properly, then transmission wave 520 may need to be altered depending on the orientation offset. FIG. 5B illustrates such an embodiment. As shown, conductive portion 508A is mated with conductive portion 518B, and conductive portion 508B is mated with conductive portion 518A. Thus, the orientation of waveguides 500 and 510 may be offset by 180 degrees, e.g., a phase offset of 180 degrees. If unaltered, the transmission wave 520 received by waveguide 500 will be offset by 180 degrees, resulting in a failure of transmission or a reception of faulty data. To compensate for such an offset, transmission wave 520 may be altered (e.g., by altering its phase by 180 degrees) to form transmission wave 522. Transmission wave 522 may thus match the orientation of waveguide 500 and be properly received.

In some embodiments, rather than altering the transmission wave 520 when a difference in orientation is detected, altering an interpretation of transmission wave 520 may occur instead. For instance, unaltered transmission wave 520 may be sent in FIG. 5B. Once the unaltered transmission wave 520 is received, the received transmission wave may be offset by 180 degrees by a receiving device.

A similar operation may be performed for circular waveguides, as shown in FIGS. 6A and 6B, which show different mating arrangements of a waveguide-to-waveguide interface for circular waveguides. Specifically, FIG. 6A illustrates an aligned waveguide-to-waveguide interface where both waveguides are arranged in the same orientation, and FIG. 6B illustrates a misaligned waveguide-to-waveguide interface where both waveguides are arranged in different orientations.

With reference to FIG. 6A, circular waveguide 600 may be properly oriented with circular waveguide 610. Proper orientation of waveguide 600 with waveguide 610 may be when conductive portions 608A and 618A are mated with one another. Because waveguides 600 and 610 are oriented properly with one another, transmission wave 620 sent through dielectric core 514 may be properly received. However, transmission wave 620 may be altered when waveguide 600 and waveguide 610 are mated in different orientations, as shown in FIG. 6B.

In FIG. 6B, conductive portion 608A is mated with conductive portion 618B, and conductive portion 608B is mated with conductive portion 618A. Thus, the orientation of waveguides 600 and 610 may be offset by 45 degrees, and transmission wave 620 may not be properly received. To compensate for such an offset, transmission wave 620 may be altered to form transmission wave 622. Transmission wave 622 may be a 45 degree offset of transmission wave 620 such that the orientation of the wave received by waveguide 620 is oriented properly. In certain embodiments, instead of sending transmission wave 622, unaltered transmission wave 620 may be sent instead and subsequently interpreted with a corresponding offset by a receiving device.

The offset of 45 degrees may be determined based upon the number of conductive portions. As shown in FIG. 6B, there are eight conductive portions (see also FIG. 4). Because there are eight conductive portions, there are eight distinctive orientations that could be arranged. Thus, given the circular structure of waveguides 600 and 610, 360 degrees is divided by eight, thereby resulting in an offset increment of 45 degrees between each orientation. Similar calculations may apply to arrangements with more or less conductive portions.

Larger numbers of conductive portions result in more accurate alignment between waveguides because of the higher sampling size. However, larger numbers of conductive portions may result in a higher number of offset increments. Having a large number of offset increments increases device complexity because the receiving device and/or transmitting device may need to be configured to be capable of altering the received or transmitted waves according to the different offset increments. At some point, the cost of having a certain number of conductive portions may outweigh the benefits achieved by having more accurate alignment. In embodiments, waveguides having greater than 12 conductive portions may be cost prohibitive.

A. Determining Waveguide Orientation

In embodiments, determining an orientation of a waveguide may be performed by sending electrical signals through conductive portions of a cladding. The electrical signals may correspond with the orientation of the transmitting waveguide. For instance, in rectangular waveguide implementations, a first electrical signal may correspond with a left side of the waveguide and a second electrical signal that is different than the first electrical signal may correspond with a right side of the waveguide. Thus, the arrangement of the different electrical signals may indicate the orientation of the transmitting waveguide.

The electrical signals may be received by a receiving waveguide when mated with the transmitting waveguide. Conductive portions of the receiving waveguide may receive the electrical signals either directly through an electrical contact or indirectly from a separate sensor. Additionally, various forms of electrical signals can be used for determining waveguide orientation. Details of such configurations are discussed herein.

B. Electrical Signals and Corresponding Detection Techniques

Various electrical signals and detection techniques may be utilized by devices to determine waveguide orientation. The type of electrical signal and corresponding detection technique may be selected to complement one another. That way, the detection technique may be configured to sufficiently detect the electrical signal. If they are not selected to complement one another, then the emitted electrical signal may not be detected, and the devices will not be able to determine waveguide orientation.

1. Voltage/Current Sensors

One type of detection technique includes utilizing voltage/current sensors. In embodiments, voltage/current sensors may be a sensor that is capable of making direct contact to an external connection. For instance, voltage/current sensors can be electrical contacts. The contacts may be exposed at an end of a waveguide or device such that an external connection, e.g., an exposed contact of another waveguide, may be coupled to it. The number of contacts used for detecting electrical signals may be selected based upon the number of conductive portions of the waveguides. That is, a one-to-one ratio of conductive portions to contacts may be achieved. For instance, if receiving and transmitting waveguides each have eight conductive portions, then eight contacts may be utilized. The contacts may be a part of the conductive portions of the waveguide cladding, or a separate conductive pad that is coupled to respective conductive portions of the waveguide cladding.

Utilizing voltage/current contacts may be a simple way to detect electrical signals given their familiar structure and ease of manufacture. Thus, utilizing voltage/current contacts may save cost by lowering manufacturing complexity.

2. Electromagnetic Sensors

Another type of detection technique includes utilizing electromagnetic sensors. One or more electromagnetic sensors may be coupled to the conductive portions of the receiving waveguide cladding. In some embodiments, one or more electromagnetic sensors may be coupled to a processor in a receiving device. The electromagnetic sensors may be positioned at an end of the receiving waveguide such that electrical signals transmitted from the conductive portions of the transmission waveguide cladding can be received.

In embodiments, the electromagnetic sensors can be any type of sensor configured to detect magnetic fields, such as a Holofax sensor. In such instances, conductive portions of the transmitting waveguide cladding can generate magnetic fields at certain frequencies. Each conductive portion may generate a magnetic field at a different frequency such that each conductive portion is distinguishable from the other conductive portions in the transmitting waveguide cladding. Respective electromagnetic sensors may detect the different magnetic fields from corresponding conductive portions of the transmitting waveguide cladding and determine its orientation.

3. Capacitive Sensors

In some embodiments, the capacitive sensors can be electrical sensors for detecting electrical charge, such as in capacitive coupling. The conductive portions of the transmitting waveguide cladding can contain different amounts of charge. Thus, when mated, the respective capacitive sensors can detect the different charges and determine the orientation of the transmitting waveguide.

Such embodiments discussed herein allow devices to determine the orientation of waveguides. However, in some embodiments, orientation of waveguides may not need to be determined to establish a successful data transmission. Instead, waveguides may include an alignment mechanism to assist the waveguides in aligning with one another in one or more orientations.

C. Magnetic Alignment

Figure 7:
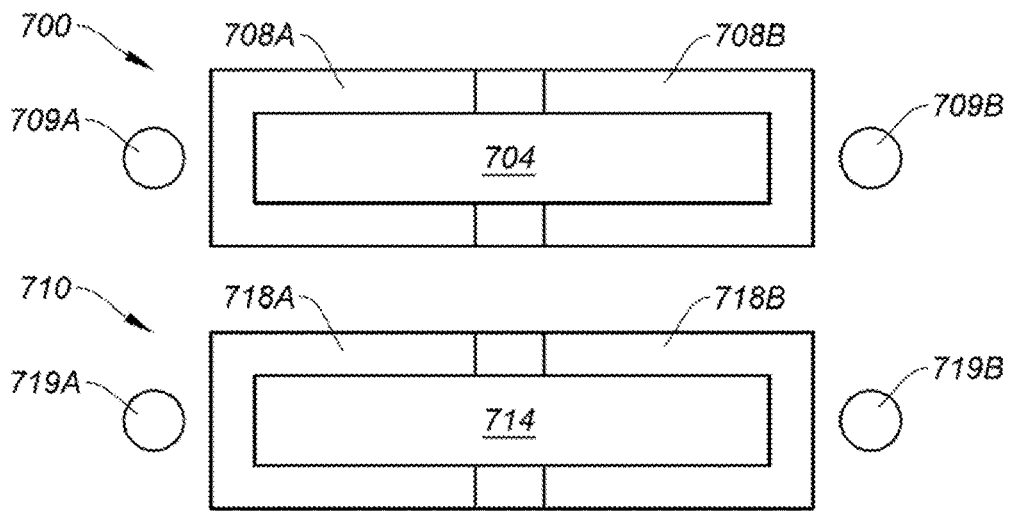
FIG. 7 is a simplified diagram of interfaces of rectangular waveguides having magnets, in accordance with embodiments of the present invention.
Figure 8:
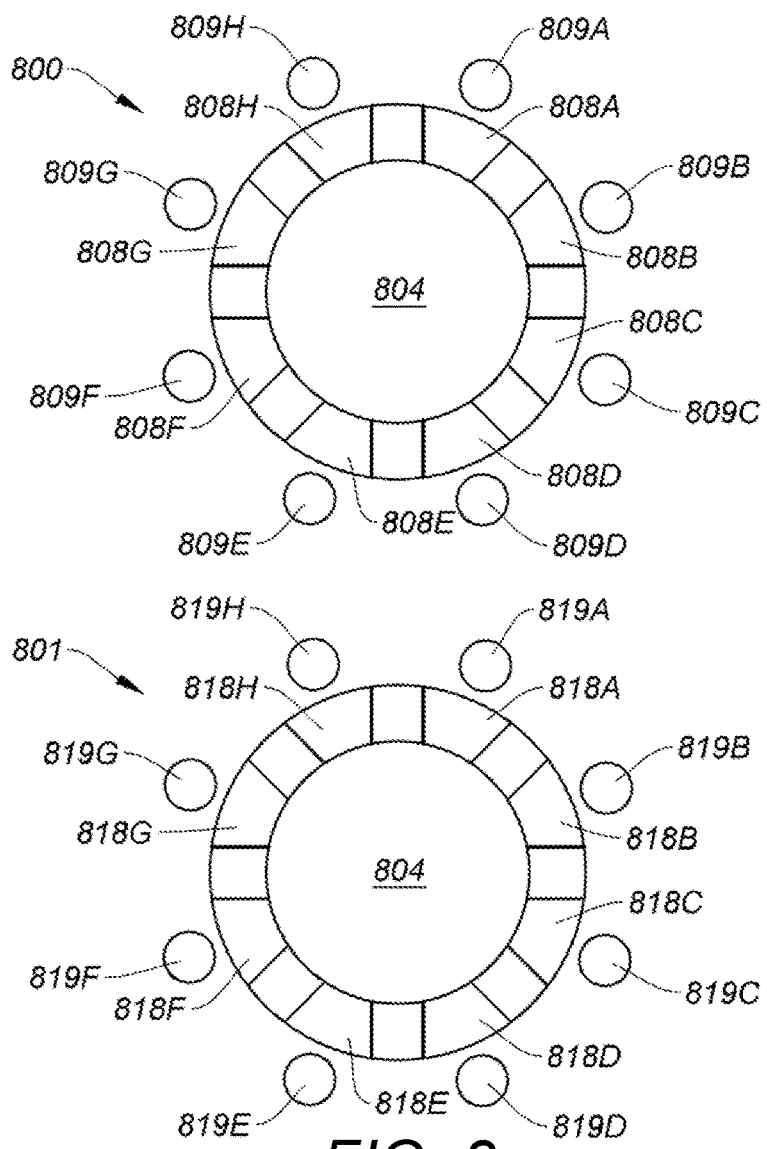
FIG. 8 is a simplified diagram of interfaces of circular waveguides having magnets, in accordance with embodiments of the present invention.

FIGS. 7 and 8 illustrate exemplary embodiments where waveguide interfaces may include magnets for alignment and connection purposes, according to embodiments of the present invention. Specifically, FIG. 7 illustrates cross-sectional views of interfacing ends of receiving and transmitting rectangular waveguides with magnets, and FIG. 8 illustrates cross-sectional views of interfacing ends of receiving and transmitting circular waveguides with magnets.

As shown in FIG. 7, a receiving waveguide 700 and a transmitting waveguide 710 each have at least one magnet 709. For example, receiving waveguide 700 may have two magnets: a first magnet 709A and a second magnet 709B. The two magnets may be positioned at any suitable location around the conductive portions. As an example, first magnet 709A may be positioned proximate to first conductive portion 708A, and second magnet 709B may be positioned proximate to second conductive portion 708B. Similarly, transmitting waveguide 700 may have two magnets: a first magnet 719A and a second magnet 719B. First magnet 719A may be positioned proximate to first conductive portion 718A, and second magnet 719B may be positioned proximate to second conductive portion 718B.

In embodiments, magnets 709A, 709B, 719A, and 719B may be configured attach receiving waveguide 700 to transmitting waveguide 710. This may be particularly useful for implementations where the mating interfaces are flat surfaces without recesses or structural features to align waveguides 700 and 710 to one another. In such embodiments, magnets 709A and 709B can be configured to attract both magnets 719A and 719B, and vice versa.

In other embodiments, magnets 709A, 709B, 719A, and 719B may be configured to arrange receiving waveguide 700 and transmitting waveguide 710 into a specific orientation. For instance, the magnets may be arranged such that conductive portion 708A can only be aligned with corresponding conductive portion 718A. In such embodiments, only magnets 709A and 719A are attracted to one another, and magnets 709B and 719B are attracted to one another. If the waveguides are oriented such that conductive portion 708A is aligned with conductive portion 718B, then magnets 709A and 719A, and magnets 709B and 719B may repel one another.

Although FIG. 7 illustrates magnets 709A and 709B disposed proximate to left and right sides of waveguide 700, embodiments are not so limited. For instance, magnets 709A and 709B may be disposed proximate to top and bottom sides of waveguide 700. It is to be appreciated that any arrangement of magnets 709A and 709B suitable to attach and orient waveguide 700 to waveguide 710 are envisioned herein to be within the spirit and scope of the present invention.

With reference to FIG. 8, receiving waveguide 800 and transmitting waveguide 810 each have at least one magnet 809. For example, receiving waveguide 800 and transmitting waveguide 810 may each have eight magnets 809A-809H, and 819A-819H, respectively. The magnets may be positioned at any suitable location around the conductive portions. As an example, each magnet may be positioned proximate to respective conductive portions as shown in FIG. 8.

In embodiments, magnets 809 and 819 may be configured to help attach receiving waveguide 800 to transmitting waveguide 810. This may be particularly useful for circular waveguides given their infinite number of mating orientations. In the embodiment shown in FIG. 8, magnets 809 and 819 can be configured to lock the waveguides in one of eight orientations. For instance, each magnet 809 may be attracted to any one of magnets 819. Thus, the waveguides 800 and 810 can be locked in any one of the eight orientations.

In other embodiments, magnets 809 and 819 may be configured to help arrange receiving waveguide 700 and transmitting waveguide 710 into a specific orientation. For instance, the magnets may be arranged such that conductive portion 808A can only be aligned with corresponding conductive portion 818A. In such embodiments, magnets 809A-809D may be attracted to magnets 819A-809D and opposed to magnets 819E-819H. Additionally, magnets 809E-809H may be attracted to magnets 819E-819H and opposed to magnets 819A-819D. That way, waveguides 800 and 810 can only be mated in one orientation. Although eight magnets are shown to achieve this functionality, more or less magnets may be used. For instance, two magnets may be used to attach the circular waveguides in one specific orientation.

The interfaces of waveguides illustrated in FIGS. 7 and 8 may be structurally fixed to respective devices, or independently rotatable from the respective devices. For instance, a structurally fixed waveguide interface may be a configuration where the waveguide interface is designed as a window on a surface of a device. The window is integrated into the device and cannot move independently of the device. On the other hand, a rotatable interface may be a configuration where the waveguide interface is part of a mechanical contraption that is attached and electrically coupled to a respective device. The mechanical contraption may be able to rotate independently of the device itself so that the device does not have to rotate in order for the waveguide interface to orient itself to another waveguide interface when mating. The waveguide interface may be electrically coupled to a respective waveguide such that the signals and waves traveling between the waveguides are still transmitted to respective devices.

Any suitable attachment technique may be utilized for positioning the magnets proximate to the waveguide interfaces of FIGS. 7 and 8. For instance, the magnets may be attached to waveguide interfaces via an adhesive or a mechanical fastener. Alternatively, the magnets may be formed to be part of the cladding. As an example, the magnets may be encased in respective claddings during manufacturing.

III. Waveguide System

Figure 9A:
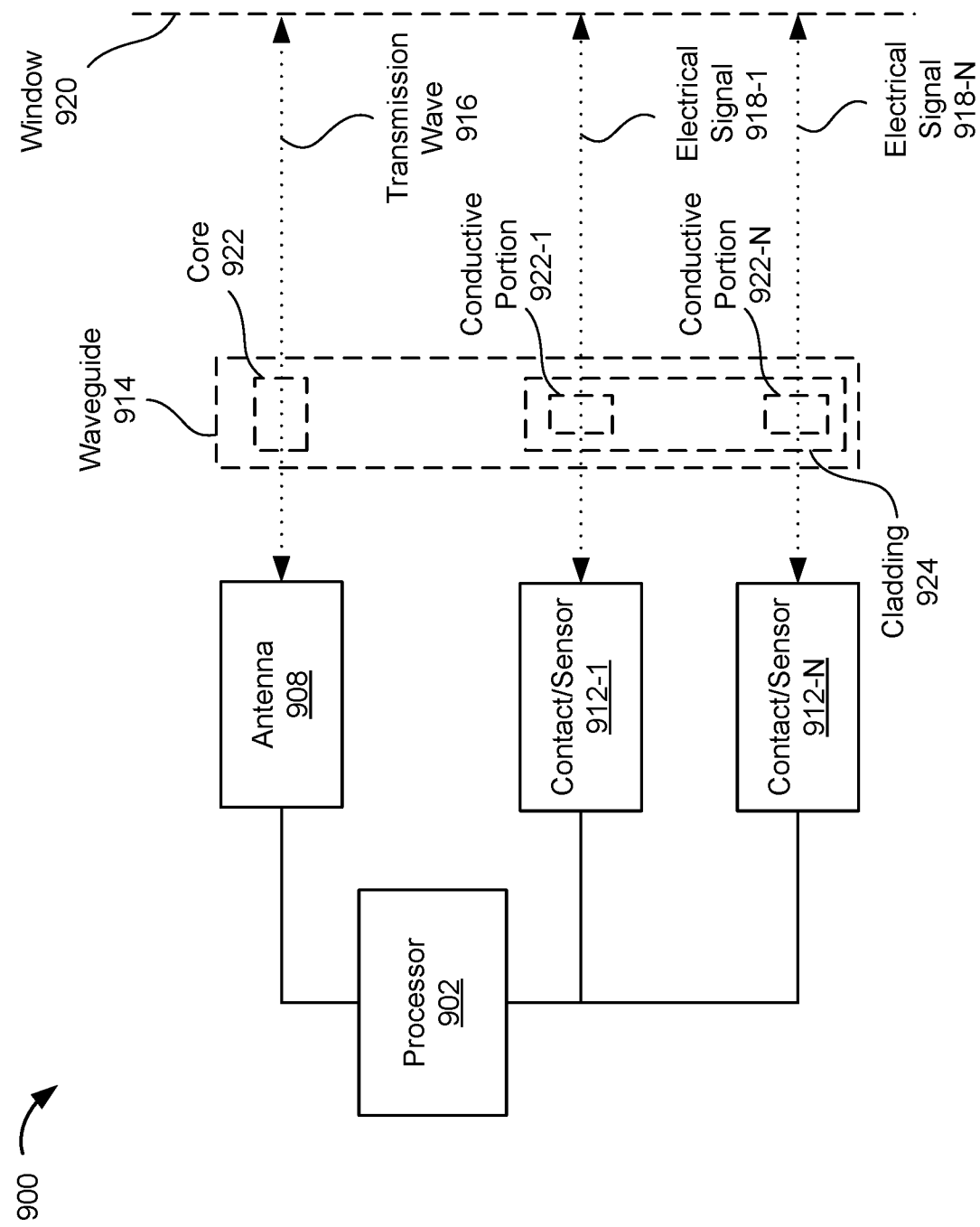
FIG. 9A is a block diagram illustrating a waveguide system, in accordance with embodiments of the present invention.
Figure 9B:
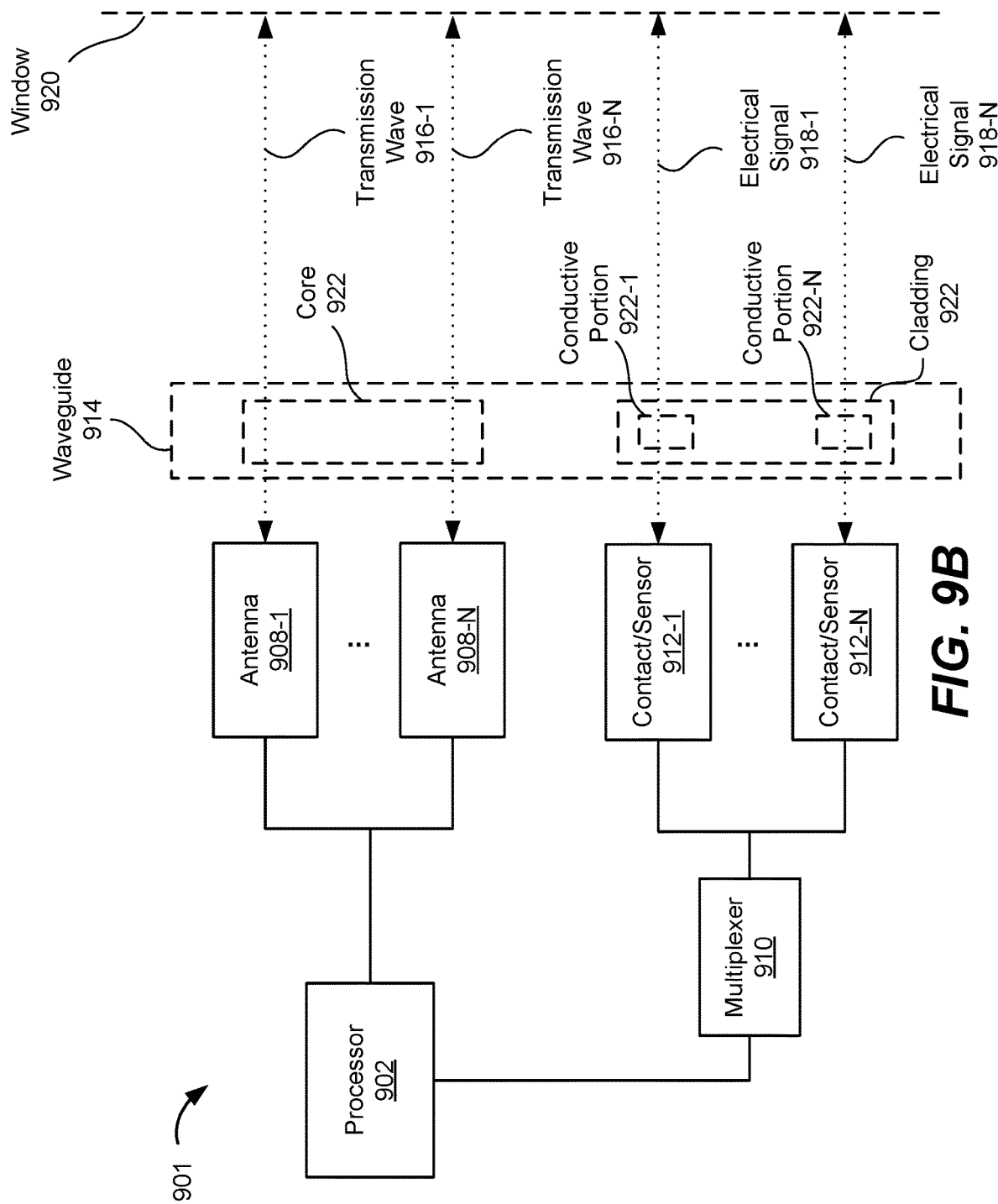
FIG. 9B is a block diagram illustrating a waveguide system, in accordance with embodiments of the present invention.

FIG. 9 illustrates an exemplary waveguide system 900, according to embodiments of the present invention. Specifically, FIG. 9A illustrates an exemplary waveguide system 900 having one antenna capable of emitting waves at different phases, and FIG. 9B illustrates an exemplary waveguide system 901 having multiple antennas where each antenna is configured to emit waves at different phases. Waveguide systems 900 and 901 may be implemented in an electronic device. The electronic device may be any suitable device capable of receiving and/or sending data. For instance, the electronic device within which waveguide systems 900 and 901 are implemented may be a device containing a computing system such as a smart phone, music player, tablet, laptop, desktop, server computer, and the like, or an accessory such as a docking station, high-definition (HD) camera/camcorder, speaker, monitor, projector, and the like.

With reference to FIG. 9A, a waveguide system 900 includes a processor 902. Processor 902 may be a standalone processor for performing functions relating to waveguide operations, or a part of a larger processor for performing a variety of functions other than those relating to waveguide operations. For instance, processor 902 may be a microcontroller, field-programmable logic array (FPGA), application-specific integrated circuit (ASIC), and the like.

Processor 902 may be coupled to an antenna 908. Antenna 908 may be a separate microchip or a part of processor 902. In embodiments, antenna 908 may be an antenna that can output transmission waves 916 at high frequencies, e.g., millimeter waves having 1 to 10 millimeters in wave length and at a frequency of 60-90 GHz. Transmission waves 916, e.g., electromagnetic waves, may be outputted through a waveguide 914 to another device through a window 920. Specifically, transmission waves 916 may be outputted through a core 922 of waveguide 914. Accordingly, processor 902 may be configured to interact with waveguide 914. In embodiments, window 920 is an RF-transparent window through which transmission waves 916 may propagate from antenna 908 to outside of the electronic device. In embodiments, antenna 908 may be capable of emitting electromagnetic waves at different phases to compensate for any offsets in waveguide orientations. For instance, in a waveguide system 900 having a rectangular waveguide 914, antenna 908 may be configured to output a transmission wave 916 at 0 degrees offset and a transmission wave 916 at 180 degrees offset.

In other embodiments, more than one antenna 908 may be utilized in a waveguide system, such as waveguide system 901 illustrated in FIG. 9B. As shown in FIG. 9B, an N number of antennas ranging from antenna 908-1 to 908-N may be included in waveguide system 901. Each antenna 908 may be configured to output a single wave at a different phase than the other antennas 908. For instance, in a waveguide system 901 having a rectangular waveguide 914, two antennas 908-1 and 908-2 may be utilized. Antenna 908-1 may output a wave at an offset of 0 degrees and antenna 908-2 may output the same wave but at an offset of 180 degrees. Each antenna 908-1 through 908-N may be located on the same microchip, or each may be located on a different microchip. Processor 902 may determine whether transmission wave 916 is outputted with an offset. This determination may depend on whether waveguide 914 is oriented properly with another waveguide (not shown, but having a system identical, if not substantially similar, to system 900).

In order to determine whether waveguide 914 is oriented properly, processor 902 may be coupled to contacts/sensors 912, as shown in FIG. 9A. Contacts/sensors 912 may send and/or receive electrical signals for determining waveguide orientation according to embodiments discussed herein. Contacts/sensors 912 may be exposed contacts or separate sensors, such as sensors for detecting magnetic fields. Electrical signals 918 may be emitted/received through conductive portions 922 in cladding 924. Although FIG. 9A illustrates contacts/sensors 912 configured to receive signals from waveguide 914, embodiments are not limited to such configurations. For instance, contacts/sensors 912 may be located at the edge of the device by window 920. Thus, contacts/sensors 912 may receive electrical signals immediately from window 920, instead of receiving electrical signals from waveguide 914.

In embodiments, a mated waveguide (not shown) in the form of a cable or an embedded waveguide may be coupled to window 920. In embodiments where the mated waveguide is in the form of a cable, the mated waveguide may simply be an extension cable that helps a waveguide in a remote system couple with the system 900. The mated waveguide may be an embedded waveguide in a device or an accessory as aforementioned herein. Core 922 and conductive portions 922 may align with respective parts of the external waveguide for determining orientation and transmitting waves. Methods of determining orientation according to embodiments of the present invention will be discussed further herein.

IV. Method of Determining Waveguide Orientation

Figure 10:
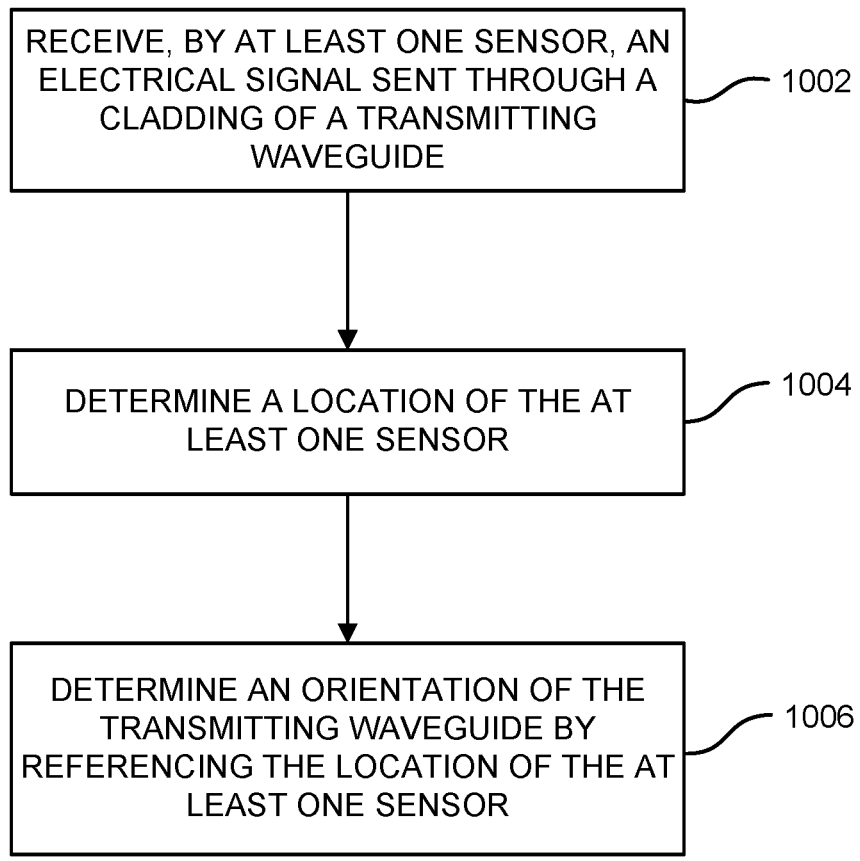
FIG. 10 is a flow chart illustrating a method of determining waveguide orientation, in accordance with embodiments of the present invention.

FIG. 10 is a flow chart illustrating a method of determining an orientation of a waveguide by a receiving device, according to embodiments of the present invention. The receiving device may be coupled to a transmitting device by having respective waveguides mate with one another. For instance, a receiving waveguide of the receiving device may be mated with a transmitting waveguide of the transmitting device.

At block 1002, an electrical signal sent through a cladding of the transmitting waveguide may be received by at least one sensor of the receiving waveguide. The electrical signal may be in the form of a voltage, current, or magnetic field. The configuration of the electrical signal may correspond to an orientation of the transmitting waveguide. As an example, for a transmitting waveguide having only first and second conductive portions, an electrical signal sent through the first conductive portion may be associated with the location of the first conductive portion.

At block 1004, the receiving device may determine a location of the at least one sensor that received the electrical signal. The receiving device may then determine the orientation of the transmitting waveguide by referencing the location of the at least one sensor that received the electrical signal at block 1006. Continuing with the aforementioned example, the receiving device may know that the electrical signal corresponds to the location of the first conductive portion of the transmitting waveguide. Thus, by receiving the electrical signal at a specific location, the receiving device may be able to determine the transmitting waveguide's orientation.

In embodiments, the electrical signal may be a handshaking signal. In such embodiments, the handshaking signal may indicate to the receiving device that it should output the determined orientation to the transmitting device. Accordingly, the receiving device may output a signal indicating an offset amount to the transmitting device through the conductive portions. As a result, the transmitting device may now be aware of the orientation of the receiving waveguide.

Figure 11:
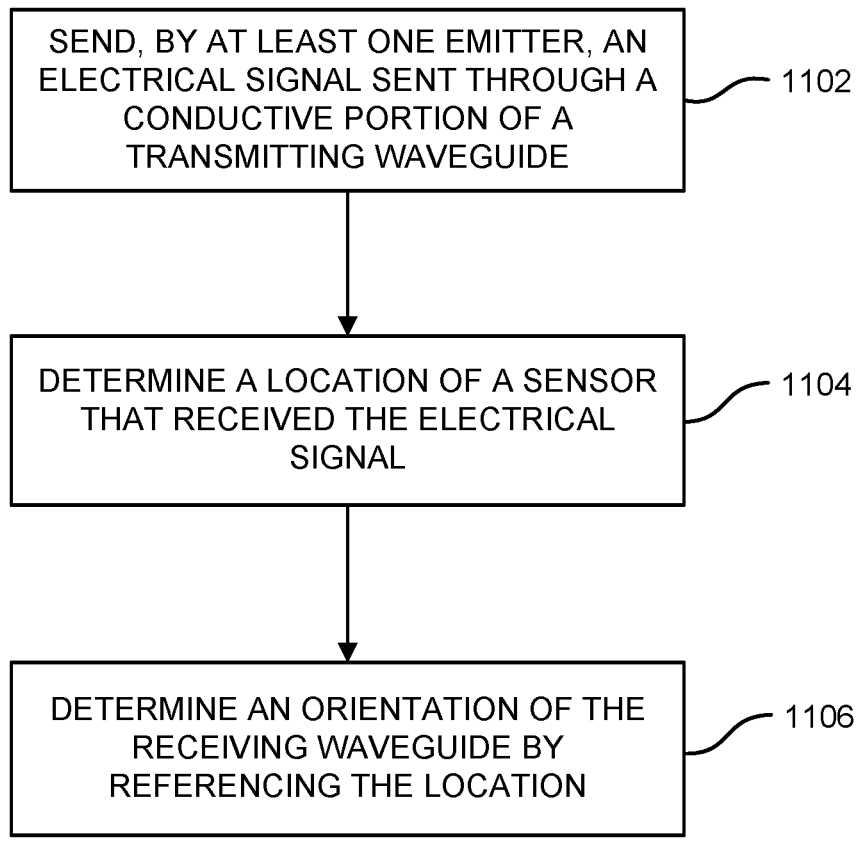
FIG. 11 is a flow chart illustrating a method of determining waveguide orientation, in accordance with embodiments of the present invention.

FIG. 11 is a flow chart illustrating a method of determining an orientation of a waveguide by a transmitting device, according to embodiments of the present invention. The receiving device may be coupled to a transmitting device by having respective waveguides mate with one another. For instance, a receiving waveguide of the receiving device may be mated with a transmitting waveguide of the transmitting device.

At block 1102, an electrical signal may be sent through a conductive portion of the transmitting waveguide by at least one emitter. The electrical signal may be used by the transmitting device to determine an orientation of the waveguide, or the electrical signal may be a handshaking signal that receives data indicating the orientation of the receiving waveguide from the receiving device. In embodiments where the electrical signal is used by the transmitting device to determine waveguide orientation, the electrical signal may be a voltage and/or current signal. The electrical signal may be received by a sensor of the receiving waveguide.

At block 1104, the transmitting device may determine a location of a sensor that received the electrical signal. In embodiments, the sensor may be part of a sensing circuit that responds to changes in current. For instance, the sensor may be an incomplete circuit that includes a circuit component, such as a resistor. When a current is applied (i.e., when the electrical signal is applied), a corresponding voltage may be generated across the resistor. The transmitting device may detect the corresponding voltage and determine the location of the sensor that received the electrical signal.

Similar to the electrical signal in the example discussed with respect to FIG. 10, the resistor location may be associated with a waveguide orientation. When the transmitting device detects the voltage, the transmitting device may determine an orientation of the receiving waveguide by referencing the location of the detected voltage at block 1106.

Although the invention has been described with respect to specific embodiments, it will be appreciated that the invention is intended to cover all modifications and equivalents within the scope of the following claims.

What is claimed is:

1. A waveguide comprising:
   a dielectric core having a circular cross-sectional shape and being formed of a material that conducts radio waves; and
   a cladding having an annular cross-sectional shape and encapsulating the dielectric core, the cladding comprising a plurality of conductive portions formed as segments of the cladding that are equally spaced apart from one another and separated by a plurality of insulation portions,
   wherein the plurality of insulation portions are formed of a conductive material coated with a layer of non-conductive material.

2. The waveguide of claim 1, wherein each insulation portion in the plurality of insulation portions is disposed between adjacent conductive portions of the plurality of conductive portions and electrically isolate adjacent conductive portions from one another.

3. The waveguide of claim 1, wherein each conductive portion is in direct contact with and disposed around less than the entire dielectric core.

4. The waveguide of claim 1, wherein the dielectric core is a solid core that conducts radio waves at and above millimeter wave frequencies.

5. The waveguide of claim 1, wherein the plurality of insulation portions have a dielectric constant different than a dielectric constant of the dielectric core.

6. The waveguide of claim 1, wherein the dielectric core is formed from a plastic.

7. The waveguide of claim 1, wherein a first conductive portion in the plurality of conductive portions is configured to provide power.

8. The waveguide of claim 1, wherein the dielectric core is concentric to the cladding.

9. The waveguide of claim 1, further comprising a plurality of magnetic alignment structures configured to preferentially attach to a corresponding magnetic receptacle to orient the waveguide in a predetermined position.

10. The waveguide of claim 9, wherein each magnetic alignment structure of the plurality of magnetic alignment structures are positioned adjacent to a respective conductive portion of the plurality of conductive portions.

11. The waveguide of claim 1 wherein the plurality of insulation portions are formed of a conductive material having an oxide layer.

12. The waveguide of claim 1 wherein the plurality of conductive portions comprise titanium and the plurality of insulation portions comprise titanium coated with a layer of oxide.

13. The waveguide of claim 7 wherein a second conductive portion in the plurality of conductive portions is configured to convey data.

14. A waveguide comprising:
   a dielectric core having a circular cross-sectional shape and being formed of a material that conducts radio waves; and
   a cladding having an annular cross-sectional shape and encapsulating the dielectric core, the cladding comprising a plurality of conductive portions formed as segments of the cladding that are equally spaced apart from one another and separated by a plurality of insulation portions,
   wherein a first conductive portion radially overlaps a second conductive portion and less than an entire region of the first conductive portion radially overlaps less than an entire region of the second conductive portion.

15. The waveguide of claim 14, wherein the plurality of insulation portions have a dielectric constant different than a dielectric constant of the dielectric core.

16. A waveguide system comprising:
   a waveguide comprising a dielectric core having a circular cross-sectional shape encapsulated by a cladding, the cladding having an annular cross-sectional shape and comprising a plurality of conductive portions that are formed as segments of the cladding that are equally spaced apart from one another and separated by a plurality of insulation portions, wherein the plurality of insulation portions are formed of a conductive material coated with a layer of non-conductive material;
   a processor configured to interact with the waveguide;
   an antenna coupled to the processor, the antenna configured to send data through the dielectric core of the waveguide; and a sensor corresponding to the antenna and coupled to the processor, the sensor configured to couple with the plurality of conductive portions of the waveguide cladding to determine an orientation of the dielectric core.

17. The waveguide system of claim 16, wherein the antenna is disposed on a separate microchip.

18. The waveguide system of claim 16 wherein the antenna is one in a plurality of antennas, wherein each antenna in the plurality of antennas is disposed on a same microchip.

19. The waveguide system of claim 16, wherein the sensor is configured to detect magnetic fields from the waveguide cladding.

20. A method comprising:
receiving, by a sensor, a first electrical signal sent through a cladding of a transmitting waveguide when the transmitting waveguide is mated with a receiving waveguide, the cladding having an annular cross-sectional shape and encapsulating a dielectric core of the transmitting waveguide, the dielectric core having a circular cross-sectional shape and being formed of a material that conducts radio waves, wherein the cladding comprises a plurality of conductive portions that are formed as segments of the cladding that are equally spaced apart from one another and separated by a plurality of insulation portions, wherein a first conductive portion radially overlaps a second conductive portion and less than an entire region of the first conductive portion radially overlaps less than an entire region of the second conductive portion;
determining a location of the sensor; and
determining an orientation of the transmitting waveguide by referencing the location of the sensor.

21. The method of claim 20, wherein the first electrical signal is sent through a conductive portion of the plurality of conductive portions of the cladding of the transmitting waveguide.

22. The method of claim 20, further comprising:
sending a second electrical signal through the cladding of the transmitting waveguide indicating the orientation of the transmitting waveguide with respect to the receiving waveguide; and
receiving transmission waves through a core of the receiving waveguide.

* * * * *